UNITED STATES PATENT OFFICE.

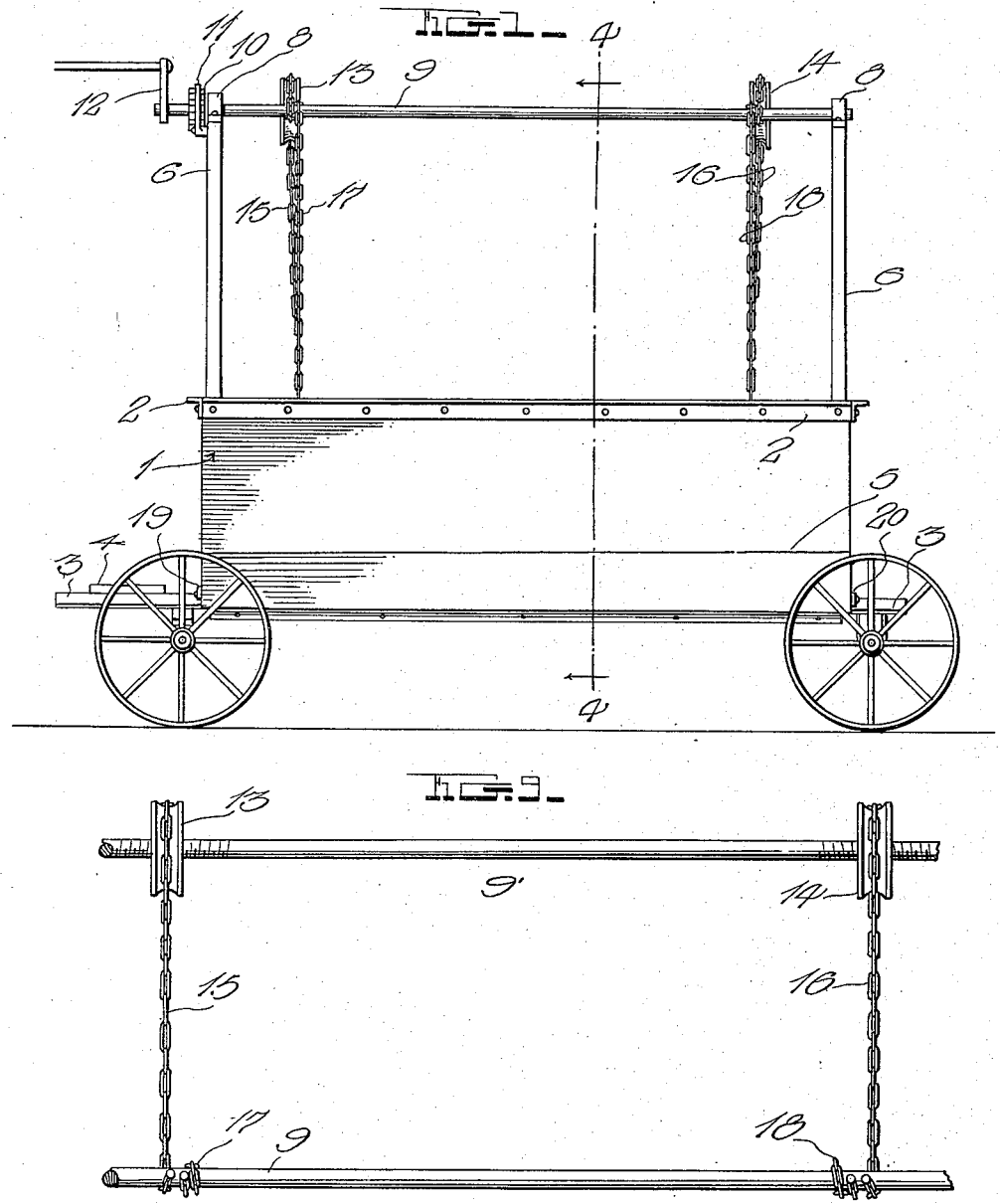

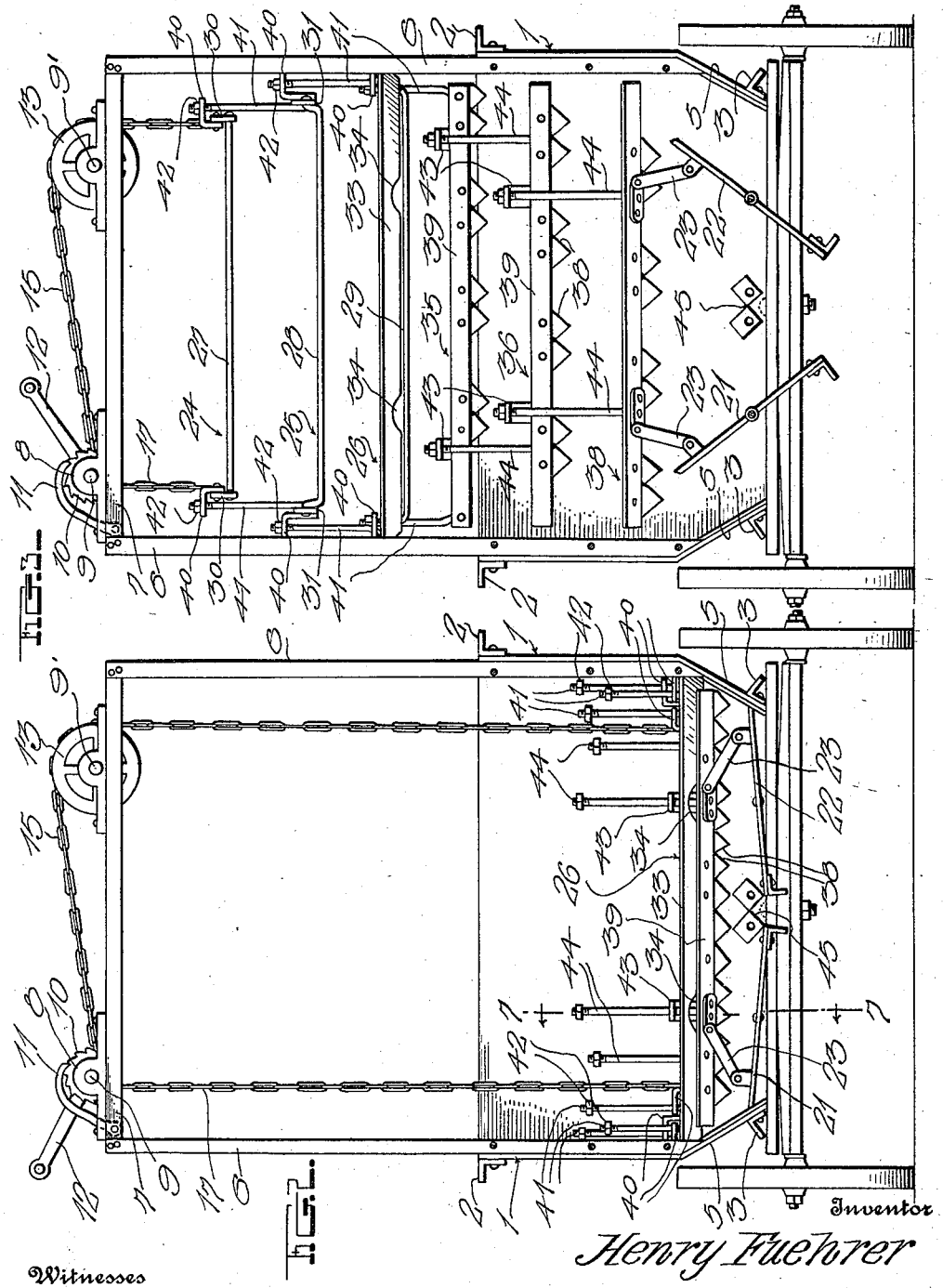

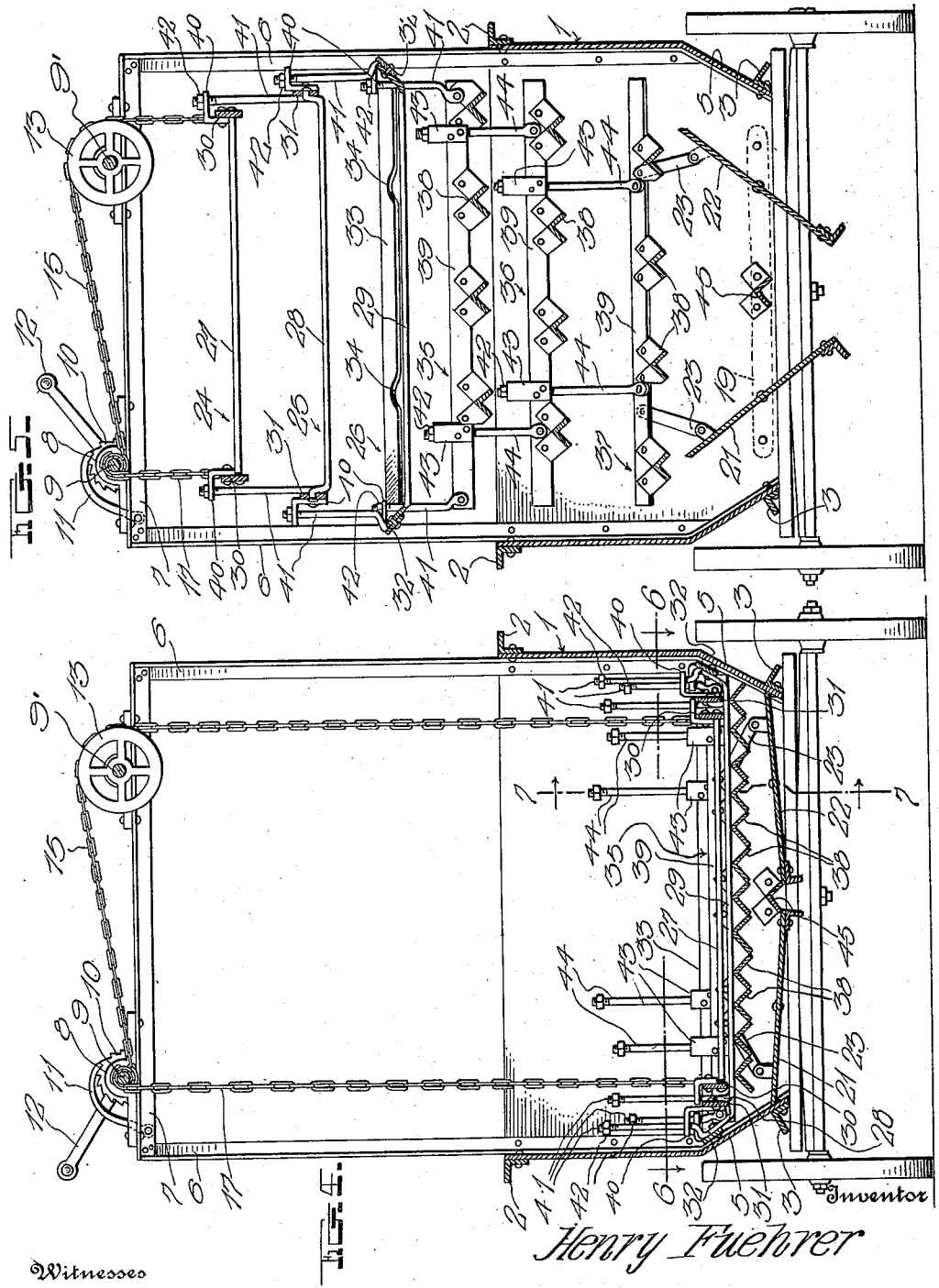

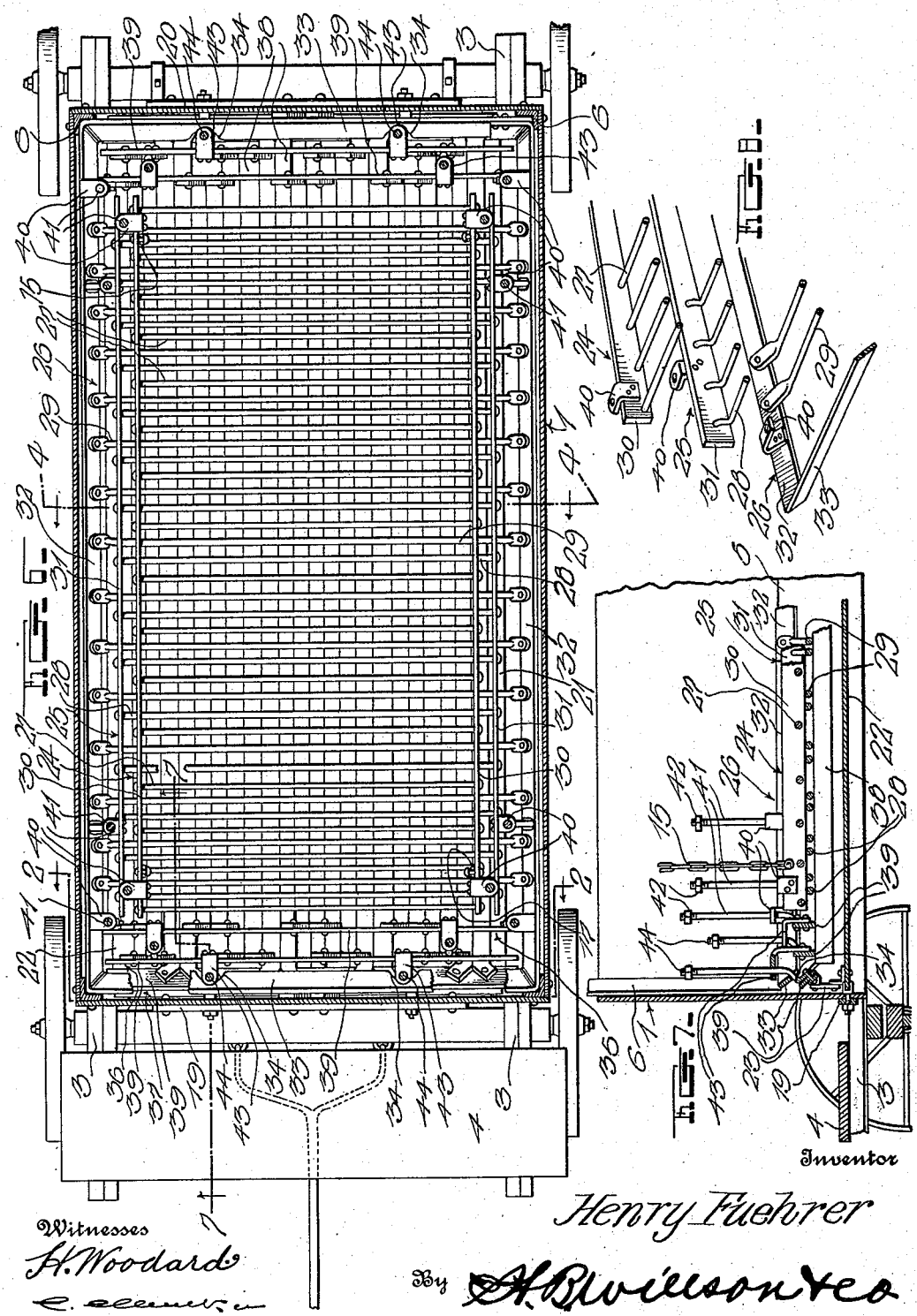

HENRY FUEHRER, OF HAZLETON, PENNSYLVANIA.

CONCRETE-MIXER.

1,157,096.  Specification of Letters Patent.  Patented Oct. 19, 1915.

Application filed December 7, 1914.  Serial No. 875,879.

*To all whom it may concern:*

Be it known that I, HENRY FUEHRER, a citizen of the United States, residing at Hazleton, in the county of Luzerne and State of Pennsylvania, have invented certain new and useful Improvements in Concrete-Mixers; and I do declare the following to be a full, clear, and exact description of the invention, such as will enable others skilled in the art to which it appertains to make and use the same.

This invention relates to improvements in concrete mixers.

The object of the invention is to provide a mixer which is simply constructed, cheap to manufacture and easy to operate and which will thoroughly mix the ingredients with a speed equal to that of high priced power mixers.

With this and other objects in view, the invention consists of certain novel features of construction, and combination and arrangement of parts as will be more fully described and claimed.

In the accompanying drawings: Figure 1 represents a side elevation of this improved mixer with the parts in position ready to receive the ingredients to be mixed; Fig. 2 is an end view thereof with the end wall of the receptacle removed to show the interior construction; Fig. 3 shows a similar view with the grates in fully raised position; Fig. 4 is a transverse section taken on the lines 4—4 of Figs. 1 and 6 with the grates collapsed and the doors at the bottom of the receptacle shown closed. Fig. 5 is a transverse vertical section showing the grates in elevated position; Fig. 6 is a horizontal section taken on the line 6—6 of Fig. 4; Fig. 7 is a detail longitudinal section taken on the lines 7—7 of Figs. 2 and 4; Fig. 8 are detail perspective views of portions of the several grates; Fig. 9 is a detail sectional view showing the means of connecting the elevating chains.

In the embodiment illustrated a receptacle 1 is shown which may be of any suitable or desired configuration and composed of any suitable material being here shown rectangular in form and constructed of sheet iron. This receptacle is preferably mounted on wheels to provide for its ready transportation from place to place and as shown has an angle iron frame 2 extending around its upper edge. Two longitudinally disposed supporting members 3 are shown secured to the bottom of this box at the sides thereof and project at one end beyond the end wall of the box to support a platform 4 for the operator. As shown the side walls 5 of this receptacle slope inwardly at their lower ends but this is not deemed an essential feature and they may be made straight if desired. Extending upwardly from the four corners of this receptacle are standards 6 which are connected at their upper ends by cross bars 7. Suitable bearings 8 are formed on these cross bars preferably near one end thereof and in which is revolubly mounted a longitudinally extending shaft 9. Fixed to this shaft 9 is a ratchet wheel 10 adapted to be engaged by a ratchet 11 mounted on one of the cross bars adjacent said ratchet wheel whereby said shaft is held in adjusted position. An operating crank handle 12 is secured to the end of the shaft 9 which is disposed at the platform carried end of the receptacle in position for ready operation by the operator on the platform. Pulleys 13 and 14 are mounted to rotate on a shaft 9' arranged parallel with shaft 9 and mounted in bearings 8 on the cross bars 7 at the side of the apparatus opposite that on which shaft 9 is disposed. These pulleys are designed to receive supporting chains 15 and 16 which are secured at one end to the shaft 9 and at their other ends to the mixing apparatus hereinafter to be described. Other chains 17 and 18 are also secured at one end to said shaft 9 and extend downwardly directly therefrom into the receptacle 1 without passing over any pulleys and are connected at their lower ends with the mixing apparatus above referred to at the side thereof opposite to that to which the chains 15 and 16 are connected. The shaft 9' is threaded as shown in Fig. 9 and the pulleys 13 and 14 have internally threaded hubs engaging said threaded shaft so that when the pulleys are rotated by the chains 15 and 16 passing thereover said pulleys will move longitudinally on said shaft—whereby they are retained in alinement with the chains as the latter are wound on or off shaft 9.

Metal bars or plates 19 and 20 are fixed to the opposite ends of the box or receptacle 1 at the lower portion thereof and are designed to support the bottom of the box which is here shown in the form of folding doors 21 and 22 the ends of which are pivotally mounted on said plates or bars 19 and 20, the pivots which connect said doors being here shown disposed midway the width of the doors. These doors are pivotally connected at their outer side edges with the lowermost member of the mixer by means of links 23 as will be hereinafter more fully described.

The interior or mixing mechanism of the apparatus comprises a plurality of grids or gratings arranged to collapse one within the other six being here shown, but it is obvious that more or less may be employed as may be found necessary or desirable. The three upper gratings 24, 25 and 26 are constructed of series of transversely arranged iron rods 27, 28 and 29 respectively which are connected at their opposite ends with longitudinally extending side members.

The uppermost grating 24 is composed of a plurality of transversely disposed grate iron rods 27 which have their opposite ends secured to side bars 30 said rods extending through said side bars which are here shown composed of angle irons.

The next to the top grating 25 is shown composed of transversely arranged rods 28 having their ends bent laterally or offset and connected with side bars 31, said rods being slightly longer than the rods 27 of the grate above to provide for the upper grate fitting within the lower.

The grating 26 is also composed of iron rods 29 made slightly longer than the rods 28 of the grate above and which have the ends thereof inclined upwardly and outwardly and secured to side bars 32, said side bars 32 being here shown slanted or inclined inwardly with their outer edges positioned adjacent the opposite side walls of the receptacle 1 to provide for the cleaning of said side walls by said side bars 32 when the gratings are elevated as will be hereinafter more fully described. The side bars 32 are connected at their opposite ends by cross bars 33 which are also shown inclined downwardly and inwardly and which have their lower edges notched or recessed as shown at 34 to adapt them to fit snugly in collapsed position, said notches or recesses being designed to receive certain of the end standards which project from the ends of one of the grates below, (see Figs. 6 and 7.)

The rods 27, 28 and 29 of the three uppermost grates 24, 25 and 26 are disposed in staggered relation so that when the grates are in collapsed position the rods of one grate will fit between those of the grate below and when raised these rods will pass through the material to be mixed at different points to insure the thorough commingling of the ingredients.

The three lowermost gratings 35, 36 and 37 are each composed of longitudinally extending laterally spaced irons 38 the irons of one grate being disposed in staggered relation to those of the grate below to adapt them when the grates are collapsed to lie side by side in close proximity and form an auxiliary bottom for the receptacle 1 as shown clearly in Figs. 2 and 4. The angle irons 38 of which the three lower gratings are inverted V-shaped in cross section and composed are disposed with their apices projecting upwardly to adapt them to pass through the ingredients to be mixed and to deflect said ingredients in opposite directions therefrom. These irons 38 are connected at their opposite ends to suitable cross bars 39 and may be secured thereto in any suitable or desired manner. The end bars of the lowermost grating are here shown inclined downwardly and inwardly to position their upper edges adjacent the end walls of the receptacle 1 so that when said grating is elevated these edges will cut through the cement near the side walls of the receptacle and thus prevent clogging of the apparatus.

Extending laterally from the side bars of the three uppermost gratings are apertured lugs or ears 40 those on one grating being disposed out of alinement with those on the other gratings to prevent them from engaging each other when the grates are collapsed. These apertured lugs or ears 40 are designed to slidably engage upright rods or standards 41 which are secured to the gratings below and which form guides for the gratings above to insure their proper operation relative to each other. As shown these upright rods or standards 41 have nuts 42 at their upper ends which limit the upward movement of the gratings on the respective rods.

The three lowermost gratings are provided with laterally extending apertured ears or eyes 43 on their end members or cross bars and which are also designed to slidably receive rods or standards 44 disposed on the end bars of the grates below, said eyes 43 of these grates being also disposed out of alinement to prevent interfering when the grates are collapsed. The end bars of the lowermost grate 37 are connected with the links 23 to which the dumping doors 21 and 22 are also connected and by means of which said doors are opened when said lowermost grating is elevated a predetermined distance.

The chains 15, 16, 17 and 18 are connected at their lower ends to the corners of the top grate 24 and when the shaft 9 is rotated in one direction these chains are wound up thereon and thus exert an elevating action on the grates, the uppermost grate being first raised a distance equal to the length of the rods 41 carried by the grate below and after this top grate has been raised this distance the ears 40 thereof will engage the nuts on the rods 41 below and thus exert a lifting action on the second grate. The further turning of the shaft 9 will raise the second grate a distance equal to the length of the rods 41 on which it is slidably mounted without affecting any of the grates below until the eyes or ears on said second grate engage the nuts on the rods 41 of the grate below when a lifting action will be exerted on the other grate and this will be similarly lifted on the turning of the shaft 9. The continued turning of the shaft will correspondingly raise the three lower grates in the same manner as that above described, one grate being raised a predetermined distance before the one below it is affected. In this manner the bars or rods from which the grates are composed will cut through the ingredients disposed in the receptacle 1 and thoroughly mix them, it being understood that water is supplied to said receptacle from any suitable source before the lifting of the first grate occurs.

When the lowermost grate 37 has been raised a certain distance the continued upward movement thereof will cause an upward pull on the links 23 whereby the outer edges of the doors 21 and 22 will be raised causing their inner edges to swing downwardly into the position shown in Figs. 3 and 5, thus dumping the contents of the receptacle 1 and when so dumped the concrete will be thoroughly mixed ready for use.

A longitudinally extending stop member 45 is shown connected at its opposite ends with the end bars or plates 19 and 20 midway the length thereof and against which the inner edges of the doors 21 and 22 are designed to abut when in closed position thus limiting their closing movement and forming a tight bottom for the receptacle 1.

In the use of this mixer when the grates are in collapsed position as shown in Figs. 2 and 4, the longitudinally extended inverted angle irons 38 of the grates 35, 36 and 37 will be disposed side by side and form a complete floor or auxiliary bottom for the receptacle 1 and the rods from which the upper three grates are composed will be disposed one between the other in substantially the same planes. The ingredients from which the concrete is to be formed are then placed in the receptacle over the rods of the grate elements prepared in the following order; the stones or large aggregates are first placed in the receptacle and leveled and the interstices thereof are then filled with sand and over the sand is placed the cement. When these ingredients have been so placed the water to be commingled therewith is supplied from any suitable source preferably from a tank disposed over the mixture, and not shown. The crank 12 is then turned and the grates raised in succession as above described cutting through all the ingredients as the water rushes in over the same. Finally when all of the grates have been raised the concrete will be thoroughly mixed and ready for use and a continued upward movement of the lower grate will exert an upward pull on the links 23 and thus release the doors 21 and 22 and thereby dump the mixed concrete from the receptacle 1 onto any suitable or desired surface.

After all of the cement has been dumped from the receptacle 1 the shaft is turned in the opposite direction to unwind the chains and permit the grates to be gradually lowered into collapsed position ready for another charge of ingredients to be mixed.

From the foregoing description it will be obvious that this apparatus may be operated manually but if desired power may be applied for raising the grates according to the size of the apparatus, it being especially designed for manual operation.

I claim as my invention:

1. A concrete mixer comprising a receptacle having a plurality of vertically movable mixing members mounted therein and each composed of spaced elements, the elements of the several members being so positioned as to lie side by side in substantially horizontal alinement when the members are in lowered inoperative position to form an auxiliary bottom for said receptacle and which operate when raised to cut through and mix the contents of said receptacle.

2. A concrete mixer comprising a receptacle having a plurality of superposed vertically movable mixing members mounted therein, each composed of spaced elements those of one member being arranged in staggered relation to those of an adjacent member, the elements of the several members being so positioned as to lie side by side in substantially horizontal alinement when the members are in lowered inoperative position to form an auxiliary bottom for said receptacle.

3. A concrete mixer comprising a receptacle having a plurality of superposed vertically movable mixing members mounted therein, coöperating rigid elements carried by said members and engaged to guide said members in their vertical movement and to prevent lateral movement thereof, and means for raising said members successively.

4. A concrete mixer comprising a receptacle having a plurality of vertically movable mixing members mounted therein and means for limiting the extent of movement of each member relatively to the other.

5. A concrete mixer comprising a receptacle having a plurality of vertically movable mixing members mounted therein, said members being each composed of a plurality of transversely extending longitudinally spaced rods, the rods of one member being arranged in staggered relation to those of the next member.

6. A concrete mixer comprising a receptacle having a plurality of vertically movable mixing members mounted therein and arranged in superposed relation, coöperating guiding elements carried by said members and slidably engaged with each other, and means for raising said members successively.

7. A concrete mixer comprising a receptacle having a plurality of vertically movable mixing members mounted therein in superposed relation, each of said members having apertured elements, the lower members having upwardly extending rods, the rods of one member slidably engaging the apertured elements of the member next above it, and means for limiting the movement of said members relatively to each other.

8. A concrete mixer comprising a receptacle having a plurality of vertically movable mixing members mounted therein in superposed relation, each of said members having laterally extending eyes, the lower members having upwardly extending rods, the rods of one member slidably engaging the eyes of the member above and threaded at their free ends, and nuts on the free ends of said rods for limiting the movement of said members relatively to each other, and for varying the extent of movement of said members relatively to each other.

9. A concrete mixer comprising a receptacle having a plurality of vertically movable mixing members mounted therein in superposed relation, each of said members having laterally extending eyes, the lower members having upwardly extending rods, the rods of one member slidably engaging the eyes of the member above, and adjustable means on the free ends of said rods for limiting the movement of said members relatively to each other, the eyes on one member being out of register with those of the other members.

10. A concrete mixer comprising a receptacle having a plurality of vertically movable mixing members mounted therein, some of said members having laterally spaced elements extending transversely of the receptacle and others having laterally spaced elements extending longitudinally thereof, said transverse and longitudinal elements intersecting the planes of each other to provide for the thorough mixing of the contents of the receptacle when said members are moved vertically.

11. A concrete mixer comprising a receptacle having a plurality of vertically movable mixing members some of said members having longitudinally spaced rods extending transversely of the receptacle and others having laterally spaced longitudinally extending angle bars.

12. A concrete mixer comprising a receptacle having a plurality of vertically movable mixing members some of said members having longitudinally spaced rods extending transversely of the receptacle and others having laterally spaced longitudinally extending angle bars, the angle bars of one member being disposed in reverse position and being so spaced as to fit between those of the adjacent member and in close proximity thereto, and means for raising said members.

13. A concrete mixer comprising a receptacle having a plurality of vertically movable collapsible grates mounted therein, the upper grates being composed of side bars with longitudinally spaced transversely extending rods connected therewith, said grates graduating in width from the lower toward the upper to adapt them to fit one within the other when in collapsed condition, the lower grates being composed of longitudinally extending laterally spaced bars connected at their ends, means for slidably connecting said grates in superposed relation, and means for raising said grates.

14. In a concrete mixer the combination with a supporting structure, a receptacle mounted thereon, standards rising from said receptacle, bars connecting said standards, parallel laterally spaced shafts rotatably supported by said bars, vertically movable mixing members mounted in said receptacle, pulleys threaded to move longitudinally on one of said parallel shafts, flexible elements secured at one end to the other shaft and passed over said pulleys and secured at their other ends to said mixing members, other flexible elements also secured to said last mentioned shaft and extending directly downward therefrom and engaging said mixing members, and means for rotating said last mentioned shaft for winding and unwinding said flexible elements to raise and lower said mixing elements.

15. In a concrete mixer, the combination of a receptacle, a plurality of vertically movable superposed grids mounted therein, and means for raising said grids.

16. In a concrete mixer, the combination of a receptacle, a plurality of vertically movable superposed grids mounted therein, said grids being disposed with the vertical planes of the elements of one, intersecting those of another, and means for raising said grids.

17. In a concrete mixer, the combination of a receptacle, a plurality of vertically movable superposed grids mounted therein, said grids being disposed with the cross bars of one arranged in staggered relation to those of the others.

18. In a concrete mixer, the combination of a receptacle of substantially uniform diameter throughout, a plurality of vertically movable superposed grids mounted therein and extending over the entire area of said receptacle, and means for raising said grids whereby the elements thereof are caused to cut through the contents of the receptacle and thoroughly mix them.

19. The combination of a receptacle open at both ends, a plurality of vertically movable collapsible members mounted therein and each composed of spaced elements, the elements of the several members being so positioned as to lie side by side in substantially horizontal alinement when in lowered collapsed position to form an auxiliary bottom for said receptacle, a closure for the lower end of said receptacle, means connecting said closure with one of said movable members for opening said closure on the raising of said member a predetermined distance.

20. The combination of a receptacle open at both ends, a plurality of vertically movable collapsible members mounted therein and each composed of spaced elements, the elements of the several members being so positioned as to lie side by side in substantially horizontal alinement when in lowered collapsed position to form an auxiliary bottom for said receptacle, a closure for the lower ends of said receptacle, means connecting said closure with the lowermost of said movable members for opening said closure on the raising of said member a predetermined distance.

21. In a concrete mixer, the combination of a receptacle of substantially uniform diameter throughout, a plurality of vertically movable superposed grids mounted therein and extending over the entire area of said receptacle, means connecting said grids to provide for their being moved successively predetermined distances, and elevating means connected with the uppermost grid for raising the grids successively.

22. In a concrete mixer, the combination of a receptacle open at both ends, a plurality of vertically movable superposed mixing members mounted therein, means for raising said members, a closure for the lower end of said receptacle pivoted intermediately of its ends thereto, and links pivotally connected at one end to the outer end of said closure and at their other ends to the lowermost of the vertically movable mixing members.

In testimony whereof I have hereunto set my hand in presence of two subscribing witnesses.

HENRY FUEHRER.

Witnesses:
 JOHN WILHELM,
 E. R. MARX.

Copies of this patent may be obtained for five cents each, by addressing the "Commissioner of Patents, Washington, D. C."